United States Patent
Hietalahti et al.

(10) Patent No.: US 11,431,570 B2
(45) Date of Patent: Aug. 30, 2022

(54) APPARATUS, METHODS, AND COMPUTER PROGRAMS

(71) Applicant: NOKIA TECHNOLOGIES OY, Espoo (FI)

(72) Inventors: Hannu Hietalahti, Kiviniemi (FI); Laurent Thiebaut, Antony (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/778,742

(22) Filed: Jan. 31, 2020

(65) Prior Publication Data
US 2020/0252285 A1    Aug. 6, 2020

(30) Foreign Application Priority Data

Feb. 1, 2019    (WO) ................. PCT/EP2019/052531

(51) Int. Cl.
*H04L 41/0866*    (2022.01)
*H04L 65/1066*    (2022.01)

(52) U.S. Cl.
CPC ...... *H04L 41/0866* (2013.01); *H04L 65/1066* (2013.01)

(58) Field of Classification Search
None
See application file for complete search history.

(56) References Cited

U.S. PATENT DOCUMENTS

| | | | | |
|---|---|---|---|---|
| 2018/0227871 A1* | 8/2018 | Singh | ................. | H04W 12/068 |
| 2018/0270712 A1 | 9/2018 | Faccin et al. | | |
| 2018/0324577 A1* | 11/2018 | Faccin | ................. | H04W 48/18 |
| 2019/0007992 A1 | 1/2019 | Kim et al. | | |
| 2019/0029065 A1 | 1/2019 | Park et al. | | |
| 2019/0215730 A1* | 7/2019 | Qiao | ..................... | H04L 43/087 |
| 2020/0008047 A1* | 1/2020 | Castellanos Zamora | | ..................... H04W 8/20 |
| 2020/0396678 A1* | 12/2020 | Lee | ........................ | H04W 60/04 |
| 2021/0136589 A1* | 5/2021 | Kawasaki | ............. | H04W 76/10 |
| 2021/0212136 A1* | 7/2021 | Lee | ........................ | H04W 76/12 |

FOREIGN PATENT DOCUMENTS

| | | |
|---|---|---|
| EP | 3 358 887 A1 | 8/2018 |
| WO | WO 2018/131984 A1 | 7/2018 |
| WO | WO 2018/153470 A1 | 8/2018 |

(Continued)

OTHER PUBLICATIONS

International Search Report and Written Opinion for Application No. PCT/EP2019/052531 dated Sep. 16, 2019, 10 pages.

(Continued)

*Primary Examiner* — Backhean Tiv
*Assistant Examiner* — Jonathan A Sparks
(74) *Attorney, Agent, or Firm* — Alston & Bird LLP

(57) ABSTRACT

A method comprises receiving information at a first network entity indicating a first data network identity associated with a request from a communications device; and selecting at the first network entity a second data network identity which is usable with respect to the communications device when said first data network identity is not usable with respect to said communications device, said selecting being in dependence on information associated with said communications device.

13 Claims, 10 Drawing Sheets

(56) References Cited

FOREIGN PATENT DOCUMENTS

WO   WO 2018/202284 A1   11/2018

OTHER PUBLICATIONS

*Correction to DNN Subscription*, Intel et al., 3GPP TSG-SA WG2 Meeting #127BIS (May-Jun. 2018), 5 pages.
*MME Handling of Unsupported APN*, S2-182371, 3GPP TSG-SA WG2 Meeting #126 (Feb.-Mar. 2018) 27 pages.
*Proposed Network Slicing Update to 23.501 Clause 5.15*, ZTE, S2-171023, SA WG2 Meeting #119 (Feb. 2017) 4 pages.
3GPP TS 23.401 VI6.1.0, $3^{rd}$ Generation Partnership Project; Technical Specification Group Services and System Aspects; General Packet Radio Service (GPRS) Enhancement for Evolved Universal Terrestrial Radio Access Network (E-UTRAN) Access (Release 16) (Dec. 2018), 411 pages.
3GPP TS 23.501 V15.4.0, $3^{rd}$ Generation Partnership Project; Technical Specification Group Services and System Aspects; System Architecture for the 5G System; Stage 2 (Release 15) (Dec. 2018, 236 pages.
3GPP TS 23.502 V15.4.1, $3^{rd}$ Generation Partnership Project; Technical Specification Group Services and System Aspects; Procedures for the 5G System; Stage 2 (Release 15) (Jan. 2019) 347 pages.
3GPP TS 23.503 V15.4.0, $3^{rd}$ Generation Partnership Project; Technical Specification Group Services and System Aspects; Policy and Charging Control Framework for the 5G System; Stage 2 (Release 15) (Dec. 2018) 76 pages.
Soldani, D. et al., *The 4G to 5G Network Architecture Evolution in Australia*, Australian Journal of Telecommunications and the Digital Economy, vol. 6, No. 4 (Dec. 2018) 30 pages.
Office Action for Vietnam Application No. 1-2021-04690 dated Sep. 8, 2021, 2 pages.
First Examination Report for Indian Application No. 202147039162 dated Mar. 24, 2022, 7 pages.

* cited by examiner

B1 receiving a request at a second network entity from a first network entity comprising a first data network identity associated with a request from a communications device and which is not usable with respect to said communications device and a second data network identity which is usable with respect to the communications device; and B2 providing by said second network entity a response to said request, said response to be directed to said communications device and comprising at least one of said second data network identity and said first data network identity.

Fig. 7

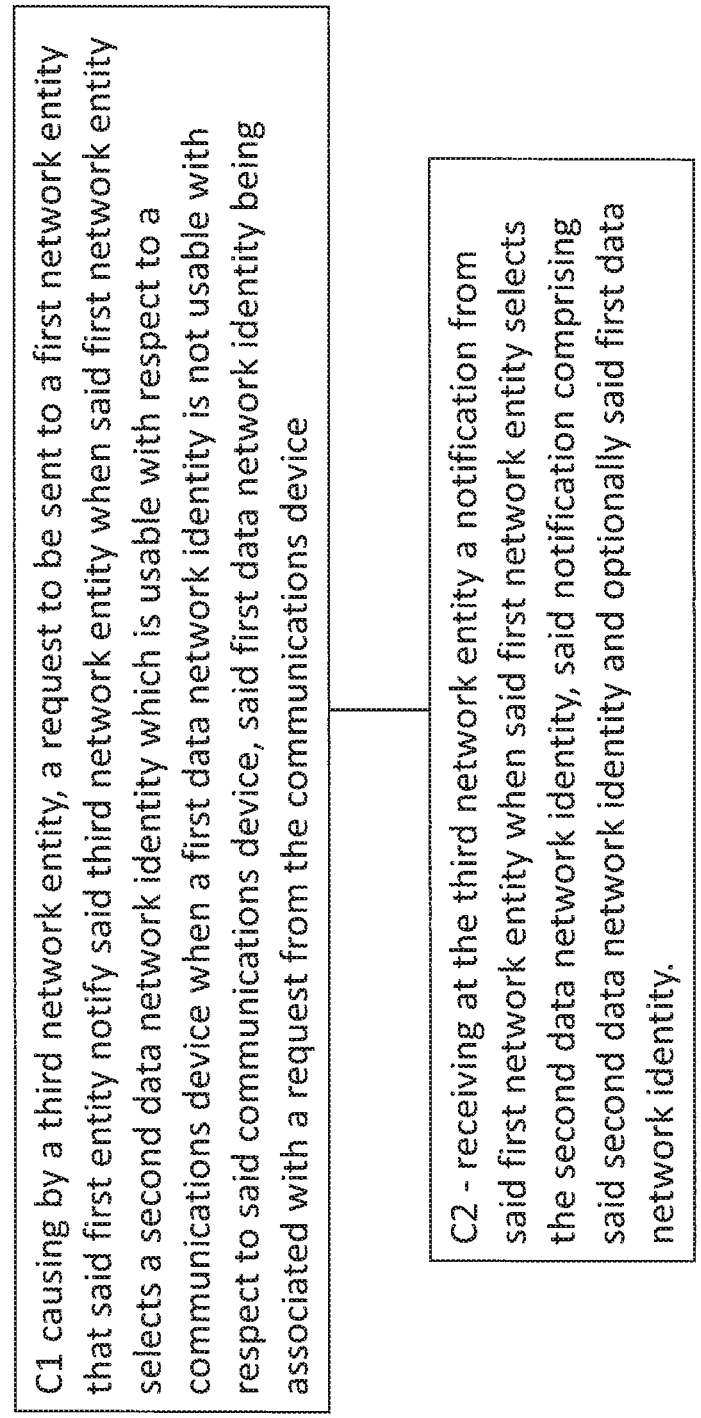

Fig. 8

C1 causing by a third network entity, a request to be sent to a first network entity that said first entity notify said third network entity when said first network entity selects a second data network identity which is usable with respect to a communications device when a first data network identity is not usable with respect to said communications device, said first data network identity being associated with a request from the communications device C2 - receiving at the third network entity a notification from said first network entity when said first network entity selects the second data network identity, said notification comprising said second data network identity and optionally said first data network identity.

APPARATUS, METHODS, AND COMPUTER PROGRAMS

CROSS-REFERENCE TO RELATED APPLICATIONS

This application claims priority to International Application No. PCT/EP2019/052531, filed Feb. 1, 2019, the entire contents of which are incorporated herein by reference.

Field of the Disclosure

The present disclosure relates to an apparatus, methods, and computer programs and in particular but not exclusively for apparatus, methods and computer programs to be used in a communications system.

Background

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communications devices.

Access to the communication system may be by means of an appropriate communications device or terminal. A communications device is provided with an appropriate signal receiving and transmitting apparatus for enabling communications, for example enabling access to a communication network or communications directly with other communications device. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved.

SUMMARY

According to an aspect, there is provided a method comprising: receiving information at a first network entity indicating a first data network identity associated with a request from a communications device; and selecting at the first network entity a second data network identity which is usable with respect to the communications device when said first data network identity is not usable with respect to said communications device, optionally said selecting being in dependence on information associated with said communications device.

The method may comprise determining at the first network entity that said first data network identity is not usable.

The method may comprise determining that said first data network identity is not usable by determining that said first data network identity is one or more of: not supported by a network; not permitted in relation to said communications device; not permitted by a policy associated with the communications device; and not permitted by a subscription associated with the communications device.

The information associated with said communications device used to select said second network identity may comprise one or more of single network slice selection assistance information, an expected service set, communications device capabilities subscription data and service related data.

At least a part of said information associated with said communications device may be provided by said communications device.

At least a part of said information associated with said communications device may be provided by said communications device in said request from the communications device.

The method may comprise using said second data network identity to select a second network entity and causing a message with at least one of said first and second data identities to be sent to the second network entity.

The method may comprise causing information to be provided to said second network entity indicating which of said first and second data identities is to be used when said second network entity communicates with said communications device.

The second data network entity may provide a session management function.

The method may comprise causing information about a configuration issue of said communications device to be sent to a third network entity, said third network entity providing policy information associated with the communications device.

The information about said configuration issue of said communications device may be associated with the first data network identity of the communications device.

The method may comprise receiving information at the first network entity from the third network entity requesting a notification of said configuration issue of said communications device.

The third network entity may provide a policy control function.

The request from the communications device may comprises a protocol data unit session request.

The first entity may comprise a mobility management function.

The method may performed in the first entity or in an apparatus of said first entity.

According to another aspect there is provided an apparatus comprising at least one processor and at least one memory including computer code for one or more programs, the at least one memory and the computer code configured, with the at least one processor, to cause the apparatus at least to: receive information indicating a first data network identity associated with a request from a communications device; and select a second data network identity which is usable with respect to the communications device when said first data network identity is not usable with respect to said communications device, optionally said selecting being in dependence on information associated with said communications device.

The at least one memory and the computer code may be configured, with the at least one processor, to cause the apparatus to determine that said first data network identity is not usable.

The at least one memory and the computer code may be configured, with the at least one processor, to cause the apparatus to determine that said first data network identity is not usable by determining that said first data network identity is one or more of: not supported by a network; not permitted in relation to said communications device; not permitted by a policy associated with the communications device; and not permitted by a subscription associated with the communications device.

The information associated with said communications device used to select said second network identity may comprise one or more of single network slice selection assistance information, an expected service set, communications device capabilities subscription data and service related data.

At least a part of said information associated with said communications device may be provided by said communications device.

At least a part of said information associated with said communications device may be provided by said communications device in said request from the communications device.

The at least one memory and the computer code may be configured, with the at least one processor, to cause the apparatus to use said second data network identity to select a second network entity and cause a message with at least one of said first and second data identities to be sent to the second network entity.

The at least one memory and the computer code may be configured, with the at least one processor, to cause the apparatus to cause information to be provided to said second network entity indicating which of said first and second data identities is to be used when said second network entity communicates with said communications device.

The second data network entity may provide a session management function.

The at least one memory and the computer code may be configured, with the at least one processor, to cause the apparatus to cause information about a configuration issue of said communications device to be sent to a third network entity, said third network entity providing policy information associated with the communications device.

The information about said configuration issue of said communications device may be associated with the first data network identity of the communications device.

The at least one memory and the computer code may be configured, with the at least one processor, to cause the apparatus to receive information from the third network entity requesting a notification of said configuration issue of said communications device.

The third network entity may provide a policy control function.

The request from the communications device may comprises a protocol data unit session request.

The apparatus may be provided in a first entity. The first entity may comprise a mobility management function.

According to an aspect there is provided an apparatus comprising circuitry configured to: receive information indicating a first data network identity associated with a request from a communications device; and select a second data network identity which is usable with respect to the communications device when said first data network identity is not usable with respect to said communications device, said selecting optionally being in dependence on information associated with said communications device.

The circuitry may be configured to determine that said first data network identity is not usable.

The circuitry may be configured to determine that said first data network identity is not usable by determining that said first data network identity is one or more of: not supported by a network; not permitted in relation to said communications device; not permitted by a policy associated with the communications device; and not permitted by a subscription associated with the communications device.

The information associated with said communications device used to select said second network identity may comprise one or more of single network slice selection assistance information, an expected service set, communications device capabilities subscription data and service related data.

At least a part of said information associated with said communications device may be provided by said communications device.

At least a part of said information associated with said communications device may be provided by said communications device in said request from the communications device.

The circuitry may be configured to use said second data network identity to select a second network entity and causing a message with at least one of said first and second data identities to be sent to the second network entity.

The circuitry may be configured to cause information to be provided to said second network entity indicating which of said first and second data identities is to be used when said second network entity communicates with said communications device.

The second data network entity may provide a session management function.

The circuitry may be configured to cause information about a configuration issue of said communications device to be sent to a third network entity, said third network entity providing policy information associated with the communications device.

The information about said configuration issue of said communications device may be associated with the first data network identity of the communications device.

The circuitry may be configured to receive information from the third network entity requesting a notification of said configuration issue of said communications device.

The third network entity may provide a policy control function.

The request from the communications device may comprises a protocol data unit session request.

The apparatus may be provided in a first entity. The first entity may comprise a mobility management function.

According to another aspect there is provided an apparatus comprising means for: receiving information indicating a first data network identity associated with a request from a communications device; and selecting a second data network identity which is usable with respect to the communications device when said first data network identity is not usable with respect to said communications device, said selecting optionally being in dependence on information associated with said communications device.

The means may be for determining that said first data network identity is not usable.

The means may be for determining that said first data network identity is not usable by determining that said first data network identity is one or more of: not supported by a network; not permitted in relation to said communications device; not permitted by a policy associated with the communications device; and not permitted by a subscription associated with the communications device.

The information associated with said communications device used to select said second network identity may comprise one or more of single network slice selection assistance information, an expected service set, communications device capabilities subscription data and service related data.

At least a part of said information associated with said communications device may be provided by said communications device.

At least a part of said information associated with said communications device may be provided by said communications device in said request from the communications device.

The means may be for using said second data network identity to select a second network entity and causing a message with at least one of said first and second data identities to be sent to the second network entity.

The means may be for causing information to be provided to said second network entity indicating which of said first and second data identities is to be used when said second network entity communicates with said communications device.

The second data network entity may provide a session management function.

The means may be for causing information about a configuration issue of said communications device to be sent to a third network entity, said third network entity providing policy information associated with the communications device.

The information about said configuration issue of said communications device may be associated with the first data network identity of the communications device.

The means may be for receiving information from the third network entity requesting a notification of said configuration issue of said communications device.

The third network entity may provide a policy control function.

The request from the communications device may comprises a protocol data unit session request.

The apparatus may be provided in a first entity. The first entity may comprise a mobility management function.

According to another aspect, there is provided a method comprising: receiving a request at a second network entity from a first network entity comprising a first data network identity associated with a request from a communications device and which is not usable with respect to said communications device and a second data network identity which is usable with respect to the communications device; and providing by said second network entity a response to said request, said response to be directed to said communications device and comprising at least one of said second data network identity and said first data network identity.

The method may comprise receiving information from said first network entity indicating which one or more of said first and second data identities is to be used when said second network entity provides said response.

The second data network entity may provide a session management function.

The request from the communications device may comprises a protocol data unit session request.

The response to the communications device may comprise a protocol data session response.

The first entity may comprise a mobility management function.

The method may performed in the second entity or in an apparatus of said second entity.

According to another aspect, there is provided an apparatus comprising means for: receiving a request from a first network entity comprising a first data network identity associated with a request from a communications device and which is not usable with respect to said communications device and a second data network identity which is usable with respect to the communications device; and providing a response to said request, said response to be directed to said communications device and comprising at least one of said second data network identity and said first data network identity.

The means may be for receiving information from said first network entity indicating which one or more of said first and second data identities is to be used in said response.

The request from the communications device may comprises a protocol data unit session request.

The response to the communications device may comprise a protocol data session response.

The first entity may comprise a mobility management function.

The apparatus may be in a second entity. The second entity may be a session management function.

According to another aspect there is provided an apparatus comprising at least one processor and at least one memory including computer code for one or more programs, the at least one memory and the computer code configured, with the at least one processor, to cause the apparatus at least to: receive a request from a first network entity comprising a first data network identity associated with a request from a communications device and which is not usable with respect to said communications device and a second data network identity which is usable with respect to the communications device; and provide a response to said request, said response to be directed to said communications device and comprising at least one of said second data network identity and said first data network identity.

The at least one memory and the computer code may be configured, with the at least one processor, to cause the apparatus to receive information from said first network entity indicating which one or more of said first and second data identities is to be used in said response.

The request from the communications device may comprises a protocol data unit session request.

The response to the communications device may comprise a protocol data session response.

The first entity may comprise a mobility management function.

The apparatus may be provided in a second entity. The second data network entity may provide a session management function.

According to another aspect, there is provide an apparatus comprising circuitry configured to: receive a request from a first network entity comprising a first data network identity associated with a request from a communications device and which is not usable with respect to said communications device and a second data network identity which is usable with respect to the communications device; and provide a response to said request, said response to be directed to said communications device and comprising at least one of said second data network identity and said first data network identity.

According to another aspect, there is provided a method comprising: causing by a third network entity, a request to be sent to a first network entity that said first entity notify said third network entity when said first network entity selects a second data network identity which is usable with respect to a communications device when a first data network identity is not usable with respect to said communications device, said first data network identity being associated with a request from the communications device; and receiving at the third network entity a notification from said first network entity when said first network entity selects the second data network identity, said notification comprising said second data network identity and optionally said first data network identity.

The method may comprise updating a routing policy associated with said communications device in response to receiving said notification.

The request from the communications device may comprises a protocol data unit session request.

The first entity may comprise a mobility management function.

The method may performed in the third entity or in an apparatus of said third entity.

The third network entity may provide a policy control function.

According to another aspect, there is provided an apparatus comprising means for: causing a request to be sent to a first network entity that said first entity notify a third network entity when said first network entity selects a second data network identity which is usable with respect to a communications device when a first data network identity is not usable with respect to said communications device, said first data network identity being associated with a request from the communications device; and receiving a notification from said first network entity when said first network entity selects the second data network identity, said notification comprising said second data network identity and optionally said first data network identity.

The means may be for updating a routing policy associated with said communications device in response to receiving said notification.

The request from the communications device may comprises a protocol data unit session request.

The first entity may comprise a mobility management function.

The apparatus may be said third entity or provided in said third entity.

The third network entity may provide a policy control function.

According to another aspect there is provided an apparatus comprising at least one processor and at least one memory including computer code for one or more programs, the at least one memory and the computer code configured, with the at least one processor, to cause the apparatus at least to: cause a request to be sent to a first network entity that said first entity notify a third network entity when said first network entity selects a second data network identity which is usable with respect to a communications device when a first data network identity is not usable with respect to said communications device, said first data network identity being associated with a request from the communications device; and receive a notification from said first network entity when said first network entity selects the second data network identity, said notification comprising said second data network identity and optionally said first data network identity.

The at least one memory and the computer code may be configured, with the at least one processor, to cause the apparatus to update a routing policy associated with said communications device in response to receiving said notification.

The request from the communications device may comprises a protocol data unit session request.

The first entity may comprise a mobility management function.

The apparatus may be said third entity or provided in said third entity.

The third network entity may provide a policy control function.

According to another aspect, there is provided an apparatus comprising circuitry configured to: cause a request to be sent to a first network entity that said first entity notify a third network entity when said first network entity selects a second data network identity which is usable with respect to a communications device when a first data network identity is not usable with respect to said communications device, said first data network identity being associated with a request from the communications device; and receive a notification from said first network entity when said first network entity selects the second data network identity, said notification comprising said second data network identity and optionally said first data network identity.

According to another aspect, there is provided a method comprising: causing by a communications device a request to be sent with a first data network identity; and receiving information at the communications device indicating that said first data network identity is updated to a second data network identity.

The receiving information may comprise receiving a response to said request with said second data network identity.

The receiving information may comprise receiving an update to routing information.

The method may comprise providing in said request, information used by said first network entity to determine that said first data network identity is to be updated.

The request may comprise a protocol data unit session request.

The received information may be received in a protocol data unit session response.

The method may performed in the communications device or in an apparatus of said communications device.

According to another aspect, there is provided an apparatus comprising circuitry configured to: cause a request to be sent with a first data network identity; and receive information indicating that said first data network identity is updated to a second data network identity.

According to another aspect there is provided an apparatus comprising at least one processor and at least one memory including computer code for one or more programs, the at least one memory and the computer code configured, with the at least one processor, to cause the apparatus at least to: cause a request to be sent with a first data network identity; and receive information indicating that said first data network identity is updated to a second data network identity.

The at least one memory and the computer code may be configured, with the at least one processor, to cause the apparatus to receive a response to said request with said second data network identity.

The at least one memory and the computer code may be configured, with the at least one processor, to cause the apparatus to receive an update to routing information.

The at least one memory and the computer code may be configured, with the at least one processor, to cause the apparatus to provide in said request, information used by a first network entity to determine that said first data network identity is to be updated.

The request comprises a protocol data unit session request.

The received information may be received in a protocol data unit session response.

The apparatus may be provided in a communications device or be a communications device.

According to another aspect, there is provided an apparatus comprising means for: causing a request to be sent with a first data network identity; and receiving information indicating that said first data network identity is updated to a second data network identity.

The means may be for receiving a response to said request with said second data network identity.

The means may be for receiving an update to routing information.

The means may be for providing in said request, information used by said first network entity to determine that said first data network identity is to be updated.

The request may comprise a protocol data unit session request.

The received information may be received in a protocol data unit session response.

The apparatus may be in a communications device or be a communications device.

According to another aspect, there is provided a method comprising: determining at a first network entity information about a misconfiguration of communications device; and causing information to be provided to a third network entity about said determined misconfiguration of said communications device.

The method may comprise receiving a request at the first network entity from the third network entity requesting that said first network entity notify said third network entity when said first network entity determines a misconfiguration of a communications device.

The determining said misconfiguration may comprises determining one or more of: a request associated with the communications device comprises a data network identity which is not usable with respect to said communications device; a request associated with the communications device indicates a session type which is not usable with respect to said communications device; a request associated with the communications device indicates single network slice selection assistance information which is not usable with respect to said communications device; and a request associated with the communications device indicates a session and service continuity mode which is not usable with respect to said communications device.

The method may comprise determining that said data network identity is not usable by determining that said first data network identity is one or more of: not supported by a network; not permitted in relation to said communications device; not permitted by a policy associated with the communications device; and not permitted by a subscription associated with the communications device.

The third network entity may provide a policy control function.

The request associated with the communications device may be a protocol data unit session request.

The first entity may comprise a mobility management function or a session management function.

The method may performed in the first entity or in an apparatus of said first entity.

According to another aspect, there is provided a method comprising: receiving information at a first network entity indicating a first data network identity associated with a request from a communications device, said first data network identity not being usable; and in response causing information to be provided to a third network entity.

According to another aspect, there is provide an apparatus comprising at least one processor and at least one memory including computer code for one or more programs, the at least one memory and the computer code configured, with the at least one processor, to cause the apparatus at least to: receive information at a first network entity indicating a first data network identity associated with a request from a communications device, said first data network identity not being usable; and in response cause information to be provided to a third network entity.

According to another aspect, there is provided an apparatus comprising means for: determining information about a misconfiguration of communications device; and causing information to be provided to a third network entity about said determined misconfiguration of said communications device.

The means may be for receiving a request from the third network entity requesting that said first network entity notify said third network entity when said first network entity determines a misconfiguration of a communications device.

The means may be for determining said misconfiguration by determining one or more of: a request associated with the communications device comprises a data network identity which is not usable with respect to said communications device; a request associated with the communications device indicates a session type which is not usable with respect to said communications device; a request associated with the communications device indicates single network slice selection assistance information which is not usable with respect to said communications device; and a request associated with the communications device indicates a session and service continuity mode which is not usable with respect to said communications device.

The means may be for determining that said data network identity is not usable by determining that said first data network identity is one or more of: not supported by a network; not permitted in relation to said communications device; not permitted by a policy associated with the communications device; and not permitted by a subscription associated with the communications device.

The third network entity may provide a policy control function.

The request associated with the communications device may be a protocol data unit session request.

The apparatus may be provided in a first entity or in an apparatus of a first entity The first entity may comprise a mobility management function or a session management function.

According to another aspect there is provided an apparatus comprising at least one processor and at least one memory including computer code for one or more programs, the at least one memory and the computer code configured, with the at least one processor, to cause the apparatus at least to: determine information about a misconfiguration of communications device; and cause information to be provided to a third network entity about said determined misconfiguration of said communications device.

The at least one memory and the computer code may be configured, with the at least one processor, to cause the apparatus to receive a request from the third network entity requesting that said first network entity notify said third network entity when a misconfiguration of a communications device is determined.

The at least one memory and the computer code may be configured, with the at least one processor, to cause the apparatus to determine said misconfiguration by determining one or more of: a request associated with the communications device comprises a data network identity which is not usable with respect to said communications device; a request associated with the communications device indicates a session type which is not usable with respect to said communications device; a request associated with the communications device indicates single network slice selection assistance information which is not usable with respect to said communications device; and a request associated with the communications device indicates a session and service continuity mode which is not usable with respect to said communications device.

The at least one memory and the computer code may be configured, with the at least one processor, to cause the apparatus to determine that said data network identity is not usable by determining that said first data network identity is one or more of: not supported by a network; not permitted in relation to said communications device; not permitted by a policy associated with the communications device; and not permitted by a subscription associated with the communications device.

The third network entity may provide a policy control function.

The request associated with the communications device may be a protocol data unit session request.

The apparatus may be provided in a first entity or in an apparatus of a first entity The first entity may comprise a mobility management function or a session management function.

According to another aspect, there is provided a method comprising: causing by a third network entity, a request to be sent to a first network entity that said first network entity notify said third network entity when said first network entity determines a misconfiguration of a communications device.

The method may be performed in the third entity or an apparatus in the third entity.

The third entity may be a policy control function.

According to another aspect, there is provided an apparatus comprising means for causing, a request to be sent to a first network entity that said first network entity notify a third network entity when said first network entity determines a misconfiguration of a communications device.

The apparatus may be the third entity or the apparatus may be provided in the third entity.

The third entity may be a policy control function.

According to another aspect there is provided an apparatus comprising at least one processor and at least one memory including computer code for one or more programs, the at least one memory and the computer code configured, with the at least one processor, to cause the apparatus at least to: cause a request to be sent to a first network entity that said first network entity notify a third network entity when said first network entity determines a misconfiguration of a communications device.

The apparatus may be the third entity or the apparatus may be provided in the third entity.

The third entity may be a policy control function.

According to an aspect there is provided a computer program comprising computer executable code which when run on at least one processor is configured to cause any of the previously described methods to be performed.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Embodiments will now be described, by way of example only, with reference to the accompanying Figures in which:

FIG. 7 shows a method of some embodiments performed in a second network entity;

FIG. 8 shows a method of some embodiments performed in a third network entity;

DETAILED DESCRIPTION OF THE FIGURES

In the following certain embodiments are explained with reference to communications devices capable of communication via a wireless cellular system and communication systems serving such communications devices. Before explaining in detail the exemplifying embodiments, certain general principles of a wireless communication system, access systems thereof, and communications devices are briefly explained with reference to FIGS. 1 to 4 to assist in understanding the technology underlying the described examples.

An example of wireless communication systems are architectures standardized by the 3rd Generation Partnership Project (3GPP). A latest 3GPP based development is often referred to as 5G. Other examples of radio access system comprise those provided by base stations of systems that are based on technologies such as wireless local area network (WLAN) and/or WiMAX (Worldwide Interoperability for Microwave Access). It should be appreciated that although some embodiments are described in the context of a 5G system, other embodiments may be provided in any other suitable system including but not limited to subsequent systems or similar protocols defined outside the 3GPP forum.

Figure 1:
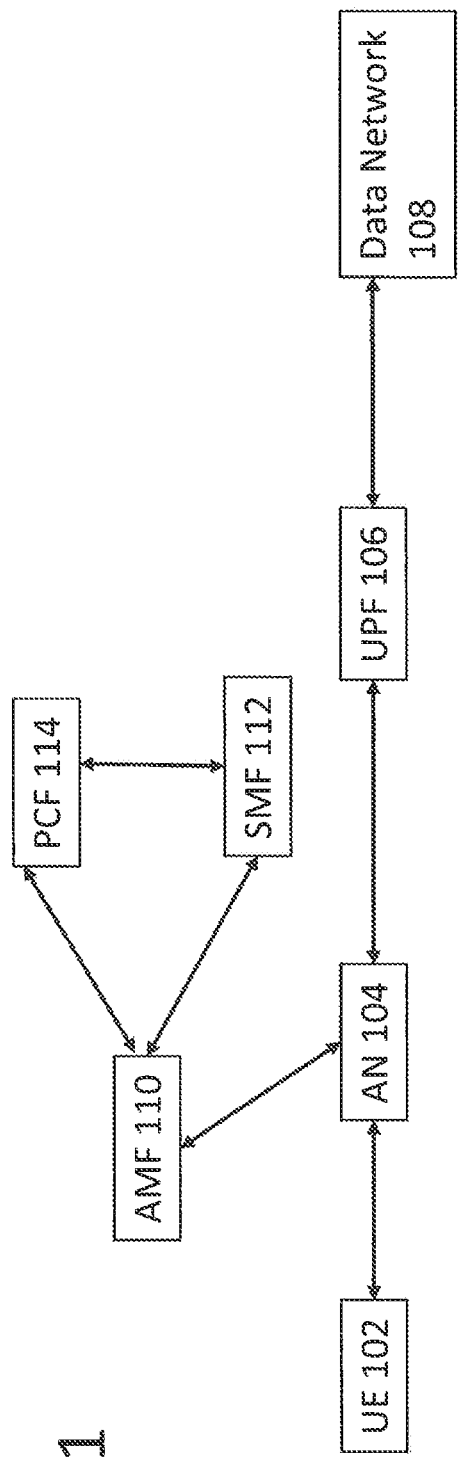
FIG. 1 shows a schematic representation of a communication system.

Reference is made to FIG. 1 which shows an example system in which some embodiments may be provided. The system may be a wireless communications. It should be appreciated that the system of FIG. 1 is a 5G system but other embodiments may be used in association with any other suitable standard or system.

A communications device 102 is provided. This will be referred to as a UE but it should be appreciated that the device may be any suitable communications device and the term UE is intended to cover any such device. Some examples of communications devices are discussed below and as used in this document the term UE is intended to cover any one or more of those devices and/or any other suitable device.

The communications device has a wireless connection to an access node AN 104. This access node may be a gNB or a ng-eNB. It should be appreciated that the information exchange between the UE and the AMF may alternatively take place over a non 3GPP access to the 5GC (5G core network.). For example this may be over a non 3GPP interworking function for non-3gpp access N3IWF, a trusted non 3GPP access function TNGF, an access gateway for wireline access W-AGF, or any other similar function.

The AN 104 is configured to communicate with an access and mobility management function (AMF) 110. The AMF may provide functions which relate to UE-based authentication, authorisation, registration, mobility and/or connection management.

The AMF 110 is configured to communicate with a session management function (SMF) 112. The SMF may provide session management functions, such allocating Internet Protocol (IP) addresses to UEs.

The AMF 110 and the SMF 112 are configured to communicate with a policy control function (PCF) 114. The PCF may determine policies about mobility and session management for a given UE for the UE, AMF or SMF to enforce.

The access node AN 104 is configured to communicate with a user plane function (UPF) 106. The UPF 106 is configured to communicate with a data network DN 108.

Figure 2:
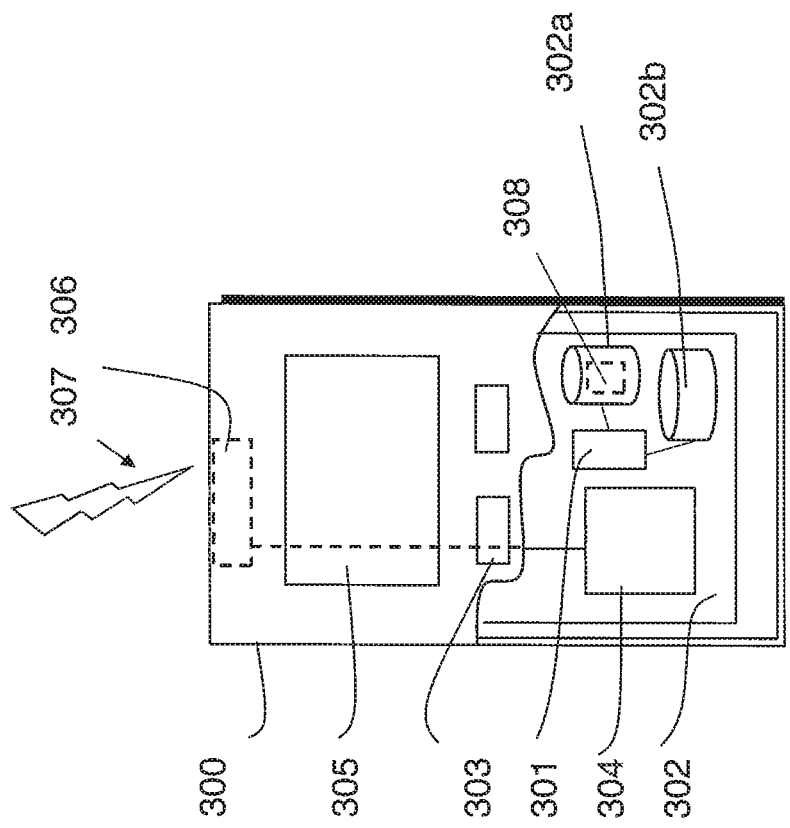
FIG. 2 shows a schematic representation of a communications device.

FIG. 2 illustrates an example of a communications device 300, such as the wireless communications device 102, 104 or 105 shown on FIG. 1. The wireless communications device 300 may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine-type communications (MTC) devices, IoT type communications devices or any combinations of these or the like.

The device 300 may receive signals over an air or radio interface 307 via appropriate apparatus for receiving and may transmit signals via appropriate apparatus for transmitting radio signals. In FIG. 2 transceiver apparatus is designated schematically by block 306. The transceiver apparatus 306 may be provided for example by means of a radio part and associated antenna arrangement. The antenna arrangement may be arranged internally or externally to the mobile device.

The wireless communications device 300 may be provided with at least one processor 301a and at least one memory. The at least one memory may comprise at least one ROM 302a and/or at least one RAM 302b. The communications device may comprise other possible components 303 for use in software and hardware aided execution of tasks it is designed to perform, including control of access to and communications with access systems and other communications devices. The at least one processor 301 is coupled to the at least one memory. The at least one processor 301 may be configured to execute an appropriate software code 308 to implement one or more of the following aspects. The software code 308 may be stored in the at least one memory, for example in the at least one ROM 211b.

The processor, storage and other relevant control apparatus can be provided on an appropriate circuit board and/or in chipsets. This feature is denoted by reference 304.

The device may optionally have a user interface such as key pad 305, touch sensitive screen or pad, combinations thereof or the like.

Optionally one or more of a display, a speaker and a microphone may be provided depending on the type of the device.

Communication protocols and/or parameters which shall be used for the connection are also typically defined. The communications devices may access the communication system based on various access techniques.

Figure 3:
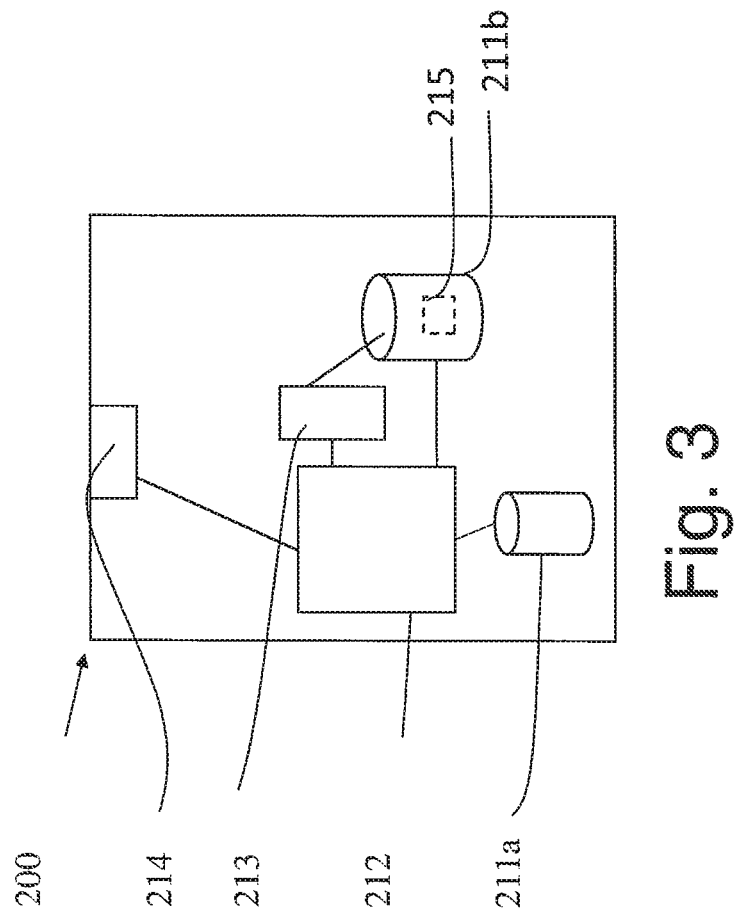
FIG. 3 shows a schematic representation of an apparatus.

An example apparatus is shown in FIG. 3. FIG. 3 shows an example of an apparatus 200 for a network function such as an AMF or PCF or SMF any other suitable function. The apparatus comprises at least one memory. The at least one memory may be at least one random access memory (RAM) 211a and/or at least one read only memory (ROM) 211b, at least one processor 212, 213 and an input/output interface 214. The at least one processor 212, 213 is coupled to the RAM 211a and the ROM 211b. The at least one processor 212, 213 may be configured to execute an appropriate software code 215 to implement one or more of the following aspects. The software code 215 may be stored in the ROM 211b.

Figure 4:
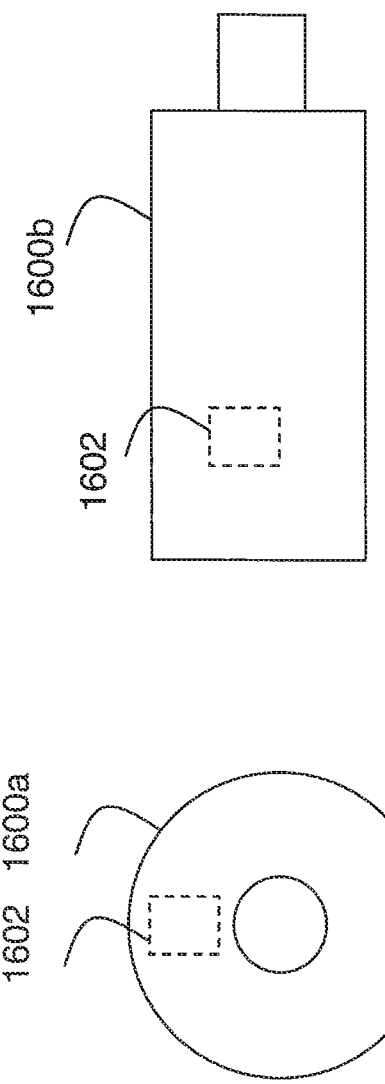
FIG. 4 shows a schematic representation of a non-volatile memory medium storing instructions which when executed by a processor allow a processor to perform one or more of the steps of the method of some embodiments.

FIG. 4 shows a schematic representation of non-volatile memory media 1600a (e.g. computer disc (CD) or digital versatile disc (DVD)) and 1200b (e.g. universal serial bus (USB) memory stick) storing instructions and/or parameters 1602 which when executed by a processor allow the processor to perform one or more of the steps of any of the methods of any of the embodiments.

One or more of the following aspects relate to a 5G system (5GS). (5G is sometimes referred to as new radio (NR)). However, it will be understood that some of these aspects may be transposed to other radio access technology systems such as UTRAN (3G radio), the long-term evolution (LTE) of the Universal Mobile Telecommunications System (UMTS) and/or any other suitable system.

In some embodiments, a first network entity such as an AMF may receive from N1 signalling from the UE information indicating a first (requested) data network identity or data network name (DNN).

The first network entity may detect that this first (requested) data network identity is either not supported by the network and/or not allowed by the subscription and/ policy related with the UE.

The first network entity may take into account further information in the UE subscription and/or UE request, and select a second (accepted) data network identity (DNN) which is supported in the network and by the user related subscription and/or policy.

If the first network entity chooses to replace the UE requested DNN by a second (accepted) DNN, then the first network entity uses the second DNN for the remainder of the procedure, including passing the second (accepted) DNN to a second network entity to be used for PDU session related operations. The second network entity may be the SMF.

The first network entity may also pass to the second network entity an indication on whether the second network entity is expected to include the UE requested or the second (accepted) DNN in the SMF response to the UE. This response may be a PDU session establishment accept response. This indication may be implicit (by including both the UE requested DNN and second DNN) or explicit, by including a specific indicator on which DNN to send to the UE.

The data used by the first entity to determine whether it needs to consider another DNN (second data network identity) other than the UE requested DNN may comprise one or more of: data identifying an expected service set; service related data; and capabilities of the communications device.

In some embodiments, the data identifying an expected service set may be S-NSSAI (single network slice selection assistance information) data or the like. A network slice is a logical end to end network. Each slice may serve a particular service type. A communications device may access a plurality of slices over the same (R)AN (or 5G AN entity connecting the UE to the 5GC), for example. The S-NSSAI is used to identify a network slice that supports a specific set of services. In some embodiments, a S-NSSAI may comprise a SST (slice/service type) and/or a SD (slice differentiator). The AMF may only take into account the SST or may take into account the full S-NSSAI when performing the selection of the second (accepted) data network identity (DNN).

The SST refers to the network slice behaviour in terms of features and services. In some embodiments, the SST may identify one of eMBB (enhanced mobile broadband), URLLC (ultra reliable low latency communications), or MIoT (massive internet of things). It should be appreciated that alternatively or additionally the SST may identify any other suitable service type.

The SD differentiates different slices of the same slice/service type. The S-NSSAI may be associated with one or more of a network ID such as a PLMN ID, network specific values, standard values.

The S-NSSAI may be provided by the UE or may be a subscribed S-NSSAI identifying an expected service set.

The capabilities of the communications device related data may comprise, for example CIoT (cellular IoT) capabilities in some embodiments. This may be provided by the communications device. This information may be provided as part of a communications device's preferred network behaviour. Alternatively or additionally, different device capability data may be provided.

The service related data may be provided by the communications device and/or contained in subscription data.

In some embodiments, the AMF may, based on one or more of the above criteria, replace the communications device requested explicit (that is non empty) DNN value by another DNN value. The AMF may inform the PCF that a DNN configuration issue in UE has been detected. The PCF updates the UE (communications device) policy of the communications device. This policy is updated as the previous policy was out-of-date, in that a non-supported DNN was requested by the communications device. The AMF notification to the PCF may be controlled by an explicit request from the PCF in order for the AMF to request a policy update from the PCF (indicating that a DNN configuration issue in UE has been detected) when the AMF has detected such UE configuration issue.

This update of the policy provides a mechanism whereby those communications devices UE(s) whose configuration is outdated are determined and a repair of the configuration policy is triggered.

The AMF indication that a DNN configuration issue in UE has been detected may trigger the PCF to perform a UE policy configuration (URSP-UE route selection policy) update.

Some embodiments provide a method whereby an AMF is able to decide which one of the supported DNNs to use instead of the non-supported DNN that was requested by the communications device.

Figure 5:
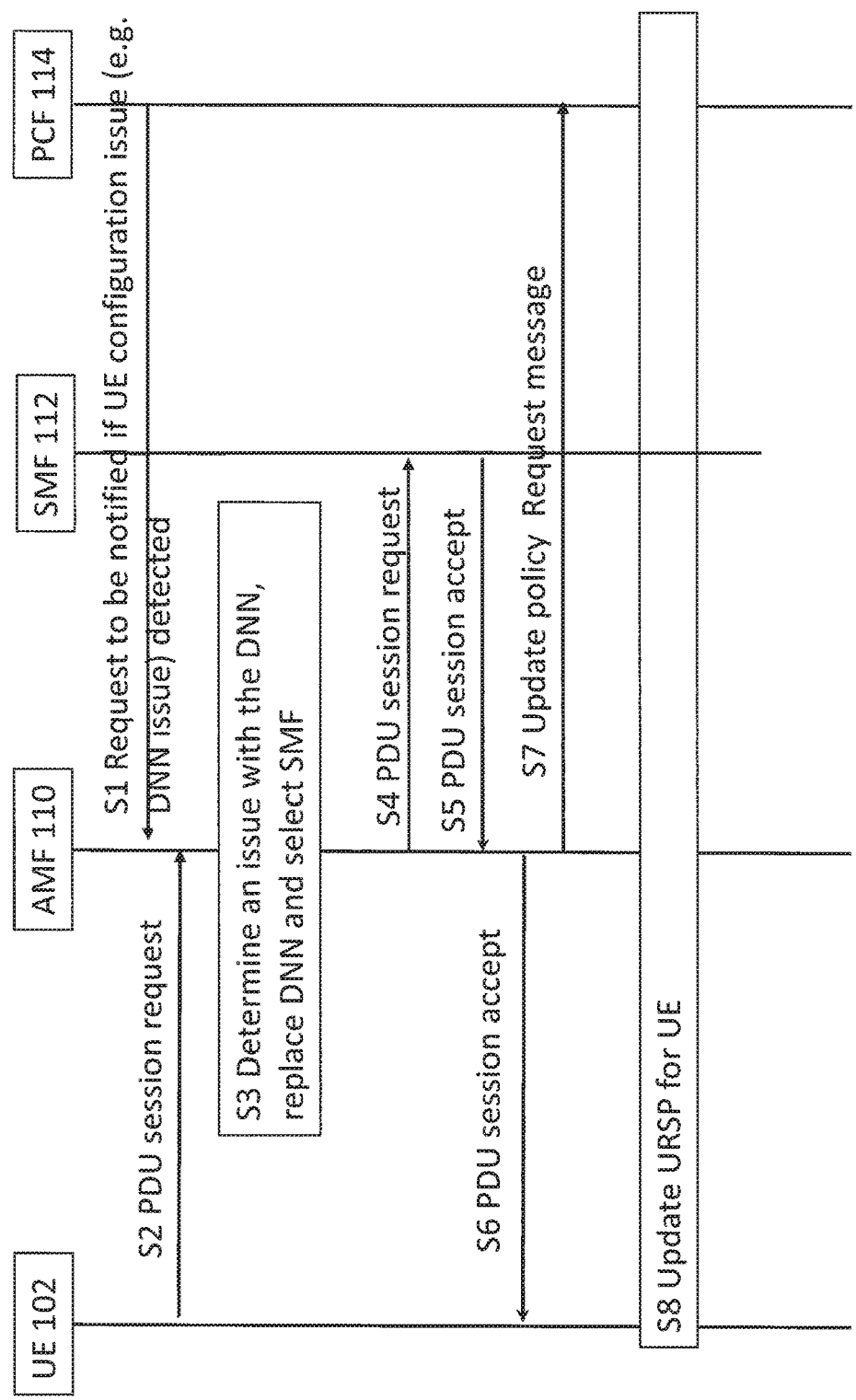
FIG. 5 shows a signalling flow of some embodiments.

One example of the interaction between the communications device, the AMF and the PCF will now be described with reference to FIG. 5.

In step S1, the PCF, as part of policy information sent to the AMF about an UE, sends to the AMF a request to be notified when a configuration issue in the UE has been detected. This may be a misconfiguration issue in the UE. In some embodiments, this configuration issue may be a DNN issue. However in other embodiments, this misconfiguration issue may be any other suitable misconfiguration issue.

This request may be for specific communications devices or any of the UEs for which the PCF stores policy information. The notification from the AMF may be any suitable update. In some embodiments, the notification may be a Npcf_AMPolicyControl_Update message.

In step S2, the UE sends a PDU (protocol data unit) session establishment request to the 5GC (5G core network) that is handled by the AMF. The UE may provide a requested DNN that the AMF needs to consider as the AMF needs the DNN for SMF selection.

In step S3, the AMF determines that there is an issue with the DNN that was requested by the UE.

This issue may be that the DNN in the request is not supported by the network or by the subscription of the UE. In such a case, the AMF may select a supported DNN. This may be as previously described. This selection may take into account one or more of the S-NSSAI information, UE capability information (e.g. CIoT support and preferred network behaviour) and the subscription information related to the S-NSSAI and/or CIoT.

After replacing the UE requested DNN with a supported DNN, the AMF uses that replaced DNN that is supported in the network for to select the SMF. In step S4, the AMF sends a PDU session request to the SMF. The request may comprise the updated DNN and optionally the UE requested DNN. The AMF may optionally pass to SMF an indication on whether the SMF is expected to include the UE requested or the second (accepted) DNN in the SMF response to the UE. This indication may be implicit (by including both UE requested DNN and second DNN) or explicit, by including a specific indicator on which DNN to send to the UE.

The SMF includes a DNN in PDU session related procedures. The DNN or DNNs which are included may be dependent on the information received from the AMF. For example, in step S5, the SMF sends a PDU session accept message to the AMF with the updated DNN.

The PDU session accept message provided by the SMF to AMF may be directed by the AMF to the UE in step S6.

The AMF may indicate to the SMF (in step S4) whether the replaced DNN can be shown to the UE or if the DNN replacement needs to be done inside the network only and hidden from the UE. The UE may include the requested DNN in its request (see step S2) message and the SMF includes a DNN in a SMF reply message such as a PDU session establishment accept message (This may be the message of step S5). The message from the SMF may be transported by the AMF in a downlink container. The AMF may not be expected to open up the SMF container or to change its contents. The AMF therefore needs to tell the SMF what value to send where the DNN requested by the UE has been changed. For example, the AMF informs the SMF whether to use the replaced DNN or the UE requested DNN in the message directed towards the UE (in step S6).

It should be appreciated that the SMF may use the UE requested DNN in the response message. This may be the case where for example the DNN value is updated by the PCF as will be described later. However in some embodiments, the SMF may use the updated DNN value even if the DNN value is updated by the PCF as described later.

It should be appreciated that in some embodiments, where the SMF uses the UE requested DNN value in its messages, the core network components may be using the updated DNN value.

As mentioned, the AMF may be configured (by the PCF in step S1) to determine that a PCRT (policy control request trigger) condition has occurred when a DNN configuration issue in the communications device is detected.

In some embodiments, this condition may be set up by the PCF at the initialization of an AMF-PCF association related to the policies for an UE.

In some embodiments, this condition may be torn down or removed as a trigger condition by the PCF.

In step S7, when the AMF detects a DNN configuration issue in a communications device condition, the AMF issues an update to the PCF. This may be a Npcf_UEPolicyControl_Update message or any other message to the PCF. This update message may comprise one or more of: the S-NSSAI received from the UE, the corresponding S-NNSAI used by the HPLMN (home public land mobile network) if different and the DNN received from the UE.

In step S8, this update message may trigger the PCF to update information associated with the communications device. This may ensure that the UE has the updated DNN. The UE may store the updated DNN. For example, the PCF may update the URSP associated with the communications device. The update from the PCF to UE may comprise an update to URSP rules. The URSP rules indicate which DNN the UE shall use to carry the traffic of an application. When this application is started on the UE, the UE is to ensure that a PDU session towards the DNN configured in the URSP is established. In some embodiments, the UE will store the new or updated URSP rules that have the updated DNN.

In some embodiments, steps S7 and S8 may run in parallel with steps S4 to S6 or even take place before those steps.

Steps S1, S7 and S8 may be omitted in some embodiments.

In some embodiments step S6 may be omitted.

In another embodiment, the AMF may determine that there is an issue with the DNN. When an issue is determined, the AMF may cause the SMF return a response to the UE with the updated DNN. The UE will then update it stored DNN to the updated DNN and use that updated DNN in the future. In some embodiments, the response from the network corresponds to a PDU session accept response of step S6 which originates from the SMF. This message may thus be used by the UE to detect that the network has replaced the UE requested DNN by another DNN that the serving network wants to use instead of the UE requested DNN. The UE could in such case store the updated DNN that was replaced by the network in order to use it instead of the DNN that was requested by the UE, or as an alias of the DNN that was requested by the UE. In this way, the network indicates to the UE dynamically that the DNN requested by the UE is not valid, and the UE should start using another ("updated") DNN instead of the one that it requested. In such an embodiment, steps S1, S7 and S8 may be omitted.

It should be appreciated the 5GC (5G core network) supports a PDU connectivity service i.e. a service that provides exchange of PDUs between a communications network and a data network identified by a DNN. The PDU connectivity service may be supported via PDU Sessions that are established upon request from the communications device.

The subscription information for each S-NSSAI may contain a subscribed DNN list and one default DNN. When the communications device does not provide a DNN in a NAS (non access stratum message) containing a PDU session establishment request for a given S-NSSAI, the serving AMF determines the DNN for the requested PDU session by selecting the default DNN for this S-NSSAI if a default DNN is present in the subscription Information. Otherwise the serving AMF selects a DNN that corresponds with this S-NSSAI. This may be as previously described.

If the DNN provided by the communications device is not supported by the network and the AMF cannot select an SMF by querying NRF (as e.g. the NRF does not provide SMF supporting the requested DNN either in HPLMN or in the local PLMN), the AMF replaces the unsupported DNN by a supported DNN. This may be as outlined previously. When determining which DNN value to use, the AMF may consider the S-NSSAI and the UE preferred network behaviour indicated by the UE or subscription data or both.

Figure 6:
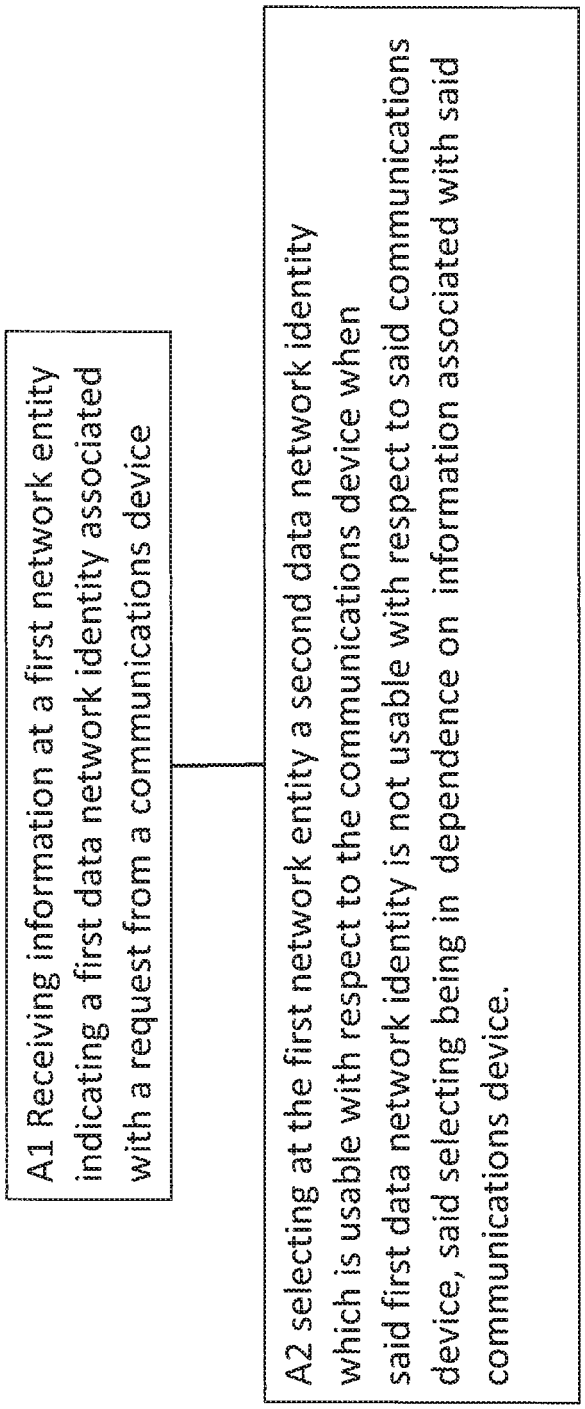
FIG. 6 shows a method of some embodiments performed in a first network entity.

Reference is made to FIG. 6 which shows a method of some embodiments. This method may be performed in a first network entity or by an apparatus in the first network entity. The apparatus may comprise at least one processor and at least one memory including computer code for one or more programs, the at least one memory and the computer code configured, with the at least one processor, to cause the apparatus at least to perform the method of FIG. 6.

In step A1, the first network receives information indicating a first data network identity associated with a request from a communications device.

In step A2, the first network entity selects a second data network identity which is usable with respect to the communications device when said first data network identity is not usable with respect to said communications device, said selecting being in dependence on information associated with said communications device.

The first network entity may be an AMF or any other suitable network entity.

Reference is made to FIG. 7 which shows a method of some embodiments. This method may be performed in a second network entity or by an apparatus in the second network entity. The apparatus may comprise at least one processor and at least one memory including computer code for one or more programs, the at least one memory and the computer code configured, with the at least one processor, to cause the apparatus at least to perform the method of FIG. 7.

In step B2, the second network entity receives a request from a first network entity comprising a first data network identity associated with a request from a communications device and which is not usable with respect to said communications device and a second data network identity which is usable with respect to the communications device.

In step B2, the second network entity provides a response to said request, said response to be directed to said communications device and comprising at least one of said second data network identity and said first data network identity.

The second network entity may be an SMF or any other suitable network function.

Reference is made to FIG. 8 which shows a method of some embodiments. This method may be performed in a third network entity or by an apparatus in the third network entity. The apparatus may comprise at least one processor and at least one memory including computer code for one or more programs, the at least one memory and the computer code configured, with the at least one processor, to cause the apparatus at least to perform the method of FIG. 8.

In step C1, the third network entity causes a request to be sent to a first network entity that said first entity notify said third network entity when said first network entity selects a second data network identity which is usable with respect to a communications device when a first data network identity is not usable with respect to said communications device, said first data network identity being associated with a request from the communications device.

In step C2, the third network entity receives a notification from said first network entity when said first network entity selects the second data network identity, said notification comprising said second data network identity and optionally said first data network identity.

The third network entity may be a PCF or any other suitable network function.

Figure 9:
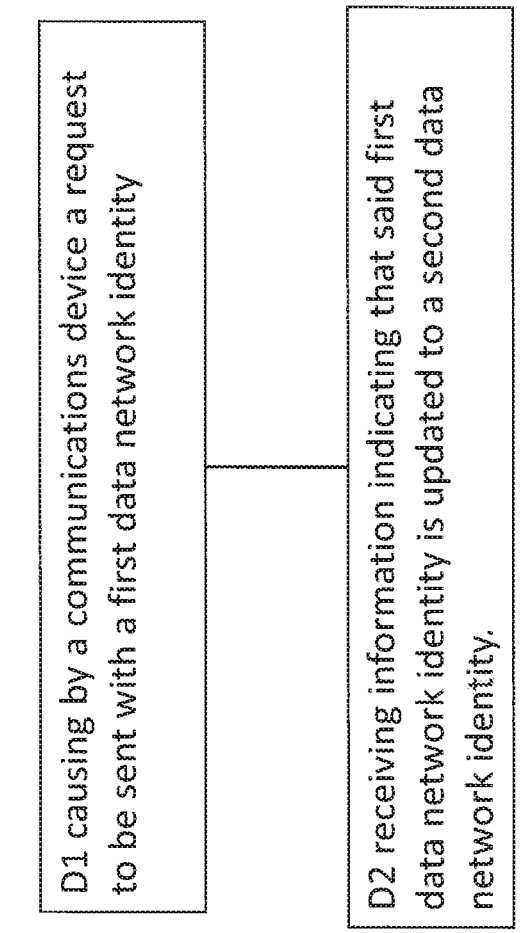
FIG. 9 shows a method of some embodiments performed in a communications device.

Reference is made to FIG. 9 which shows a method of some embodiments. This method may be performed in a communications device or by an apparatus in the communications device. The apparatus may comprise at least one processor and at least one memory including computer code for one or more programs, the at least one memory and the computer code configured, with the at least one processor, to cause the apparatus at least to perform the method of FIG. 9.

In step D1, the communications device causes a request to be sent with a first data network identity.

In step D2, the communications device receives information indicating that said first data network identity is updated to a second data network identity.

Figure 10:
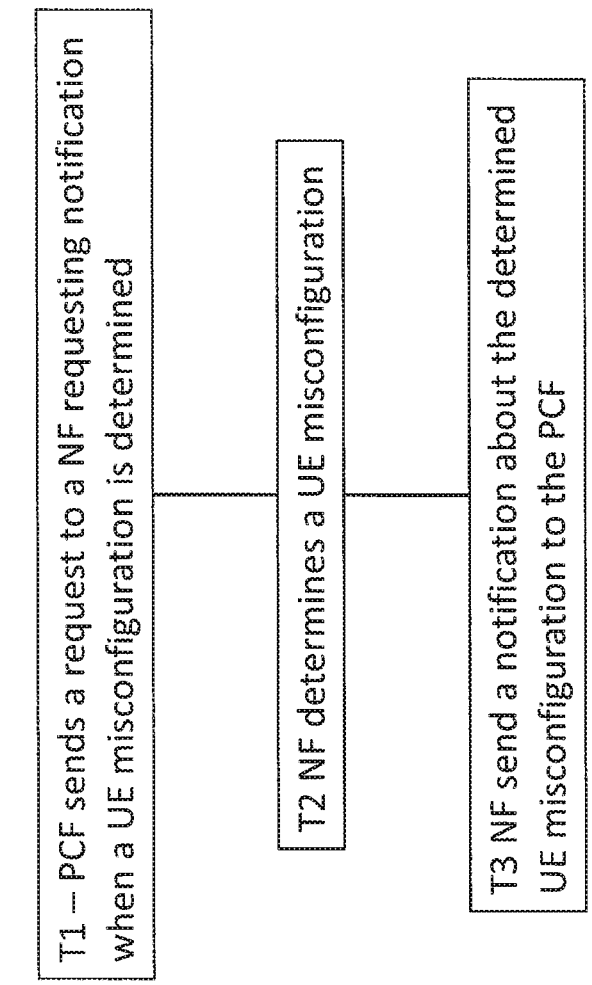
FIG. 10 shows another method of some embodiments.

Reference is made to FIG. 10 which shows another embodiment.

In step T1, a network function receives from a PCF 114 a request that the network function notify the PCF when there is a misconfiguration of a communications device. That network function may be an AMF, a SMF or any other suitable network function. This step may be optional in some embodiments.

In step T2, the network function determines that there is a misconfiguration of the communications device.

In step T3, the network functions causes a notification of the misconfiguration to be provided to the PCF.

By way of example, the AMF detects in step T2 a UE request for PDU Session establishment targeting an unknown DNN or a DNN that is not subscribed by the user (as previously described). In this case it is the AMF that notifies the PCF in step T3.

In another example, the AMF of the HPLMN detects in step T2 a UE request for registration targeting an unknown S-NSSAI or a S-NSSAI that is not subscribed by the user. In this case it is the AMF that notifies the PCF in step T3.

In another example, the SMF detects in step T2 a UE request for PDU Session establishment targeting an unknown PDU session type or a PDU session type that is not subscribed by the user or that is incompatible with the DNN. In this case it is the SMF that notifies the PCF in step T3.

In another example, the SMF detects in step T2 a UE request for PDU session establishment targeting an unknown SSC (session and service continuity) mode or a SSC mode that is not subscribed by the user or that is incompatible with the DNN. In this case it is the SMF that notifies the PCF in step T3.

It is noted that while the above describes example embodiments, there are several variations and modifications which may be made to the disclosed solution without departing from the scope of the present invention. For example, the above aspects are not limited to 5GS. These aspects may be transposed to other radio access technology systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., in FIGS. 5 to 10 may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:
   at least one processor; and
   at least one memory including computer program code;
   the at least one memory and the computer program code configured to, with the at least one processor, cause the apparatus at least to perform:
   cause a request to be sent to a first network entity that said first network entity notify said apparatus when said first network entity determines that a request originating from a communications device comprises a data network identity which is configured to identify a data network for a data session with the communications device and which is not usable with respect to said communications device, wherein said request to notify said apparatus is to cause a first data network identity associated with a request from said communications device and not supported by said network to be replaced by a second data network identity supported by said network.

2. The apparatus as claimed in claim 1, wherein the data network identity which is not usable with respect to said communications device is one or more of: not supported by said network; not permitted in relation to said communications device; not permitted by a policy associated with the communications device; or not permitted by a subscription associated with the communications device.

3. The apparatus as claimed in claim 1, wherein said first network entity comprises an access and mobility management function.

4. The apparatus as claimed in claim 1, further comprising a policy control function.

5. An apparatus comprising
   at least one processor; and
   at least one memory including computer program code;
   the at least one memory and the computer program code configured to, with the at least one processor, cause the apparatus at least to perform:
   determine information about a misconfiguration of communications device by a request originating from the communications device and comprising a data network identity which is configured to identify a data network for a data session with the communications device and which is one or more of: not supported by a network, not permitted in relation to said communications device, not permitted by a policy associated with said communications device, or not permitted by a subscription associated with said communications device; and
   cause information to be provided to a third network entity about said determined misconfiguration of said communications device, wherein providing said information to said third network entity is to cause a first data network identity associated with a request from said communications device and not supported by said network to be replaced by a second data network identity supported by said network.

6. The apparatus as claimed in claim 5, wherein the at least one memory and the computer program code are configured to, with the at least one processor, cause the apparatus at least to perform:
   receive a request from the third network entity requesting that said apparatus notify said third network entity when said apparatus determines a misconfiguration of a communications device.

7. The apparatus as claimed in claim 5, wherein determining said misconfiguration comprises determining one or more of:
   a request associated with the communications device comprises a data network identity which is not usable with respect to said communications device;
   a request associated with the communications device indicates a session type which is not usable with respect to said communications device;
   a request associated with the communications device indicates single network slice selection assistance information which is not usable with respect to said communications device; or
   a request associated with the communications device indicates a session and service continuity mode which is not usable with respect to said communications device.

8. The apparatus as claimed in claim 5, wherein said third network entity comprises a policy control function.

9. The apparatus as claimed in claim 5, further comprising an access and mobility management function.

10. An apparatus comprising
    at least one processor; and
    at least one memory including computer program code;
    the at least one memory and the computer program code configured to, with the at least one processor, cause the apparatus at least to perform:
    receive a request from a first network entity comprising a first data network identity associated with a request from a communications device and a second data network identity selected by said network to replace said first data network identity,
        wherein each of the first data network identity and the second data network identity is configured to identify a data network for a data session with the communications device, and
        wherein said first data network identity is one or more of: a data network identity not supported by said network, a data network identity not permitted in relations to said communications device, a data network identity not permitted by a policy associated with said communications device, or a data network identity not permitted by a subscription associated with said communications device; and
    provide a response to said request, said response to be directed to said communications device and comprising at least one of said second data network identity and said first data network identity.

11. The apparatus as claimed in claim 10, wherein said second data network identity is a data network identity supported by said network, selected to replace a first data network identity not supported by said network.

12. The apparatus as claimed in claim 10, wherein said first network entity comprises an access and mobility management function.

13. The apparatus as claimed in claim 10, further comprising a session management function.

* * * * *

UNITED STATES PATENT AND TRADEMARK OFFICE
CERTIFICATE OF CORRECTION

PATENT NO. : 11,431,570 B2
APPLICATION NO. : 16/778742
DATED : August 30, 2022
INVENTOR(S) : Hannu Hietalahti et al.

It is certified that error appears in the above-identified patent and that said Letters Patent is hereby corrected as shown below:

In the Claims

In Column 21, Line 50, Claim 5, delete "comprising" and insert -- comprising: --, therefor.

In Column 21, Line 56, Claim 5, delete "of" and insert -- of a --, therefor.

In Column 22, Line 36, Claim 10, delete "comprising" and insert -- comprising: --, therefor.

In Column 22, Line 54, Claim 10, delete "relations" and insert -- relation --, therefor.

In Column 22, Line 62, Claim 10, delete "and" and insert -- or --, therefor.

Signed and Sealed this
Twentieth Day of June, 2023

Katherine Kelly Vidal
*Director of the United States Patent and Trademark Office*